April 1, 1969  SABURO TAKECHI ET AL  3,436,649
ELECTRICAL SENSING APPARATUS FOR SENSING THE PRESENCE OF
A CONDUCTIVE OR MAGNETIC OBJECT WITH COMPENSATION
FOR SUPPLY VOLTAGE FLUCTUATIONS
Filed June 23, 1965

SABURO TAKECHI
KENJI IIO
INVENTORS

BY

ATTORNEY

United States Patent Office 3,436,649
Patented Apr. 1, 1969

3,436,649
ELECTRICAL SENSING APPARATUS FOR SENSING THE PRESENCE OF A CONDUCTIVE OR MAGNETIC OBJECT WITH COMPENSATION FOR SUPPLY VOLTAGE FLUCTUATIONS
Saburo Takechi, Kyoto, and Kenji Iio, Shiga, Japan, assignors to Tateisi Electronics Co., Ukyo-ku, Kyoto, Japan, a corporation of Japan
Filed June 23, 1965, Ser. No. 466,285
Claims priority, application Japan, June 24, 1964, 39/49,696
Int. Cl. G01r 33/12, 33/00
U.S. Cl. 324—41                2 Claims

ABSTRACT OF THE DISCLOSURE

An electrical sensing apparatus in the nature of a proximity detector is disclosed herein, comprising a sensing head having a primary coil responsive to an alternating current source and one or more secondary coils inductively coupled to the primary coil whereby the voltage induced in the secondary is altered by entry of an object into the field generated by the sensing head. A differential amplifier is responsively coupled to the sensing head and generates a trigger signal indicating entry of an object into the field of the sensing head. The important feature of the apparatus resides in an improved arrangement in the differential amplifier which compensates for fluctuations in the alternating current source voltage which might otherwise result in false signals at the output. The differential amplifier consists of two signal translating devices such as transistors having their differential inputs connected to the sensing head and to a reference voltage, respectively. They each have a control terminal connected to a direct current source which itself is responsively coupled to the alternating current source so that fluctuations in the latter result in relative alterations in the D.C. bias voltages applied to the signal translating devices. That is the A.C. source voltage fluctuations result in compensating relative changes in the bias voltages in the signal translating devices so that an output trigger signal still occurs for the same degree of entry of an object into the sensing head field.

BACKGROUND

This invention relates to an electrical sensing apparatus and more particularly to an electrical sensing apparatus provided with means for compensating for fluctuations of the source voltage, thereby assuring the accuracy of the detecting operation of the apparatus.

Various types of electrical sensing apparatus are known. One of them, for example, is provided with a sensing head comprising a primary coil connected to an alternating current source and a secondary coil arranged in inductive relationship with the primary coil. In such an arrangement, if an object enters the field of the sensing head, the voltage induced in the secondary coil changes, and such a change in the induced voltage is utilized as a test to detect the presence of the object within the field. In order to magnify the variation of the induced voltage, it is also well known to provide the sensing head with a pair of secondary coils connected in series so that voltages induced therein are opposite in polarity. In this case, the difference between the two induced voltages, caused by the presence of an object within the field of the sensing head, is utilized to recognize the presence of the object.

In such prior art sensing apparatus, however, any fluctuations of the source voltage necessarily result in corresponding fluctuations of the induced voltage or the difference in the two induced voltages. It is very likely to happen that the apparatus may give an erroneous indication of the detection of an object in spite of the object yet being so far way that no indication should normally have been given, or on the contrary, the apparatus may remain inoperative in spite of the presence of an object within its field so that an indication to that effect should normally have been given. In short, the sensitivity of the apparatus is very unstable with fluctuations of the soure voltage, and the apparatus is very apt to err in detecting operation.

Accordingly, the primary object of the invention is to provide an electrical sensing apparatus which is capable of maintaining its sensitivity at substantially constant level, regardless of fluctuations of the source voltage.

DESCRIPTION OF THE INVENTION

Other objects, features and advantages of the invention will be apparent from the following description of a preferred embodiment thereof, with reference to the accompanying drawings, wherein.

Figure 1:
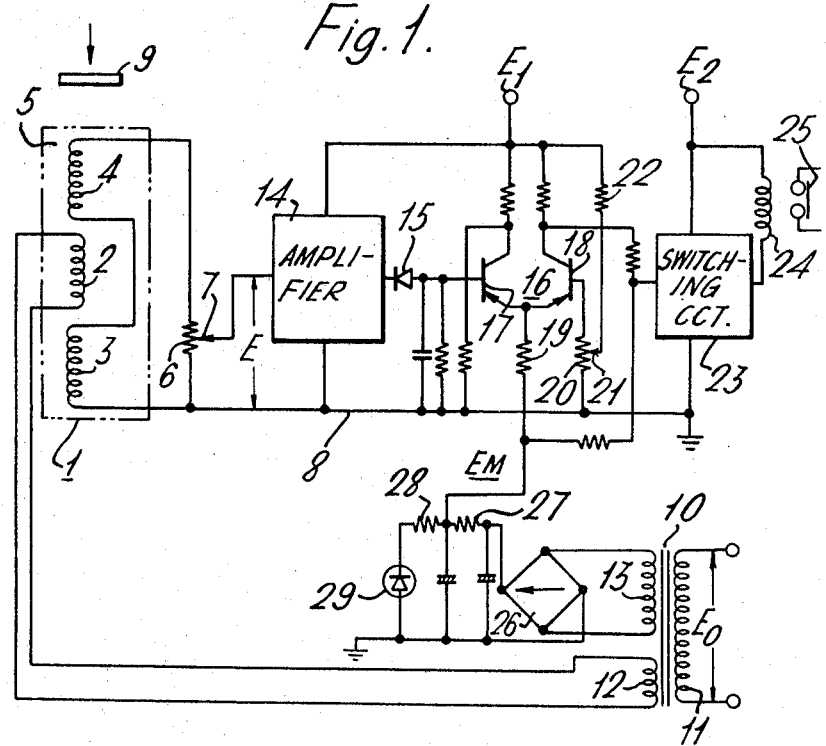
FIG. 1 is a schematic illustration of a circuit embodying the invention.

Now referring to the drawings, there is shown a sensing head generally designated 1 and in the form of a transformer 5 comprising a primary coil 2 and a pair of secondary coils 3 and 4 arranged in inductive relationship with primary coil. The secondary coils are connected in series so that the voltages induced therein are opposite in polarity, and between the opposite ends of the series combination there is inserted a resistor 6 having a slider 7. The voltage E between the slider 7 and a grounding line 8 connected to one end of the coil 3 is adjustable by adjusting the slider along the resistor 6, and the slider is adjusted so that the voltage E is as small as possible or substantially zero when there is no conductive object within the field set up upon energization of the primary coil 2.

A transformer 10 has its primary winding connected to an alternating current source E0, for example, 100 volts, 60 cycles. The transformer is provided with a pair of secondary windings 12 and 13, the winding 12 of which is conected to the primary coil 2 of the sensing head 1 to apply thereto a voltage of, say, 3 volts.

The voltage E is amplified by an alternating current amplifier 14 and then rectified by a rectifier 15 so as to be applied to a differential amplifier 16 as one of its two inputs. The differential amplifier 16 comprises a pair of transistors 17 and 18 or other signal translating or amplifying devices. The common emitter resistor 19 is connected not to the grounding line 8, as would be the case with the conventional differential amplifier, but to a direct current source $E_M$ whose voltage varies according as that of the source E0 varies, as will be described in detail hereinafter. The voltage of the source $E_M$ may, for example, be +12 volts when that of the source E0 is maintained at a rated value.

The transistor 18 has its base connected to the grounding line 8 through a resistor 20, which has a slider 21 thereon connected through a resistor 22 to a constant voltage source E1, say, −12 volts to be described later. Thus, the constant voltage E1 is applied to the base of the transistor 18 through the resistors 22 and 20. It will be seen that one of the two inputs applied to the differential amplifier 16 as a whole is held at a constant level, while the other is a voltage corresponding to the voltage E which depends upon the presence or absence of an object within the field of the sensing head 1.

The collector voltage of the transistor 18 of the amplifier 16 is applied to a switching circuit 23, such as a Schmitt circuit, which is so designed as to operate upon application thereto of an input above a predetermined level. A constant voltage source E2 is connected to the switching circuit 23 to apply to the circuit an operating voltage of, say, −16 volts. The output of the circuit 23 energizes a relay 24 to close or open its contact 25, thereby indicating the detection of an object by the sensing head 1.

It will be understood that the source voltage of the differential amplifier 16 is the sum of the voltages $E_M$ and E1, and that since the voltage $E_M$ varies as the source voltage E0 varies, the source voltage of the amplifier 16 varies accordingly.

The voltage $E_M$ may be obtained in the following manner. The voltage induced in the secondary winding 13 of the source transformer 10 is applied between the alternating current input terminals of a full-wave rectifier 26. Between the direct current output terminals of the rectifier 26 there is connected a series combination of resistors 27 and 28 and a Zener diode 29 which is in a sufficiently saturated condition from the start. The voltage $E_M$ is taken out from the junction between the resistors 27 and 28. It will be easily seen that as the source voltage E0 fluctuates, the direct current output of the rectifier 26 and consequently the current through the Zener diode 29 fluctuate, with a resulting corresponding fluctuation of the voltage $E_M$.

Figure 2:
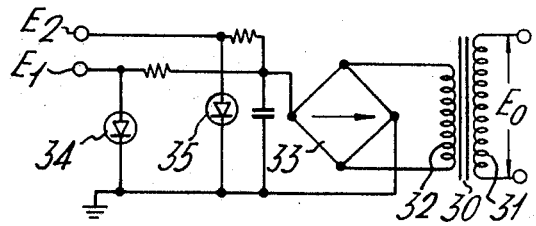
FIG. 2 is a schematic illustration of a circuit used as part of the circuit of FIG. 1.

The constant voltages E1 and E2 may be obtained by any suitable means. For example, as illustrated in FIG. 2, the source voltage E0 is applied also to the primary winding 31 of a transformer 30, and the voltages induced in the secondary winding 32 thereof is applied between the input terminals of a full-wave rectifier 33. A pair of Zener diodes 34 and 35 are connected in parallel between the output terminals of the rectifier 33. The voltages E1 and E2 are taken out from between the opposite ends of the diodes 34 and 35, respectively.

In operation, if, with the primary coil 2 being energized by the source E0, there is no conductive object within the field of the coil, the output voltage E and consequently the base voltage of the transistor 17 is very small or substantially zero, so that the transistor 17 is off, that is, not conducting, while the other transistor 18 is on, that is, conducting. Under this condition, since the input to the switching circuit 23 is below a predetermined operating level, the relay 24 remains deenergized.

On the contrary, as a conductive object 9 approaches the field of the coil 2, the voltage E increases until the base voltage of the transistor 17 exceeds the constant base voltage of the other transistor 18, whereupon the transistor 17 is switched on and the transistor 18, off. This causes the input voltage applied to the switching circuit 23 to reach its operating level, whereby the circuit 23 produces an output, which energizes the relay 24 to close or open the contact 25.

Suppose that for one cause or another there happens to be a drop in the source voltage E0. Since this drop in the source voltage necessarily causes a corresponding drop in the voltage E, this voltage E would normally become unable to switch the transistor 17 on, even with the presence of the object 9 at the same distance from the sensing head as when the source voltage E0 was at the rated level and the voltage E was at a level sufficient to switch on the transistor 17. However, the drop in the source voltage E0 has caused a corresponding drop in the voltage $E_M$ and consequently in the voltage applied to the emitters of the transistors 17 and 18. This can be considered equivalent to that there is a drop in the reference voltage of the differential amplifier 16. Then, in spite of the drop in the source voltage, the voltage E, as decreased due to the voltage drop, is kept at a level enough to switch on the transistor 17, with the object 9 being at the same distance from the sensing head 1 as before. The same is true if the source voltage E0 increases. Thus, in accordance with the invention, fluctuations in the source voltage E0 cause no substantial fluctuations in the sensitivity of the apparatus, enabling its operation with a constant accuracy.

In order to see the efficiency of the apparatus of the invention, experiments have been conducted, employing as a contrast a conventional sensing apparatus of the type having the emitters of the transistors of its differential amplifier grounded through a common resistor. The results are: ±10% fluctuations of the rated alternating current source voltage caused ±30% fluctuations in the rated sensitivity in the case of the conventional apparatus, but only less than 4% fluctuations in the case of the apparatus of the invention.

A preferred embodiment of the invention having been illustrated and described, it should be noted that various modifications and changes may be made without departing from the true scope and spirit of the invention as defined in the appended claims.

What we claim is:

1. An electrical sensing apparatus for sensing the presence of a conductive or magnetic object comprising in combination: a sensing head having a primary winding and a secondary winding arranged in inductive relationship such that the voltage induced in the secondary winding varies when a conductive or magnetic object to be detected enters the field coupling the windings when the primary winding is energized; a differential amplifier having first and second control signal input circuits for receiving two signals to be compared and also having an output circuit; indicator means connected to said output circuit; first circuit means connecting one of said control signal input circuits to said secondary winding to render said differential amplifier responsive to secondary coil output voltage variations; second circuit means connected to said second signal input circuit and providing a reference potential thereto and against which signals from said secondary winding are to be compared; an alternating power supply connected to said primary winding for applying operating potential to said sensing head; and third circuit means for providing the operating potential for said differential amplifier and causing variations in the alternating power supply voltage to simultaneously shift the operating point of said differential amplifier, said third circuit means including rectifier means and a voltage divider circuit connecting said alternating power supply to said differential amplifier, said differential amplifier being connected to an intermediate point on said voltage divider circuit for the receipt of its operating power, whereby variations in the alternating power supply voltage will simultaneously shift the operating point of said differential amplifier and the energization level of said sensing head in off-setting directions to compensate for the power supply voltage variations.

2. An electrical sensing apparatus as defined in claim 1 wherein said third circuit means further includes a Zener diode connected in series circuit with first and second resistors, which resistors form said voltage divider circuit and said differential amplifier includes first and second transistors connected in parallel circuit relationship with their emitters directly interconnected and with each of the emitters being connected through a third resistor to the junction of said first and second resistors.

References Cited

UNITED STATES PATENTS 3,267,351 8/1966 Martin _____ 321—16
3,249,915 5/1966 Koerner.

FOREIGN PATENTS 681,734 3/1964 Canada.
875,567 8/1961 Great Britain.

RUDOLPH V. ROLINEC, *Primary Examiner.*

R. J. CORCORAN, *Assistant Examiner.*

U.S. Cl. X.R.

340—38